US010581295B2

United States Patent
Albl et al.

(10) Patent No.: US 10,581,295 B2
(45) Date of Patent: Mar. 3, 2020

(54) ELECTRONIC COMPONENT FOR AN ELECTRIC MOTOR OF AN INDIVIDUAL WHEEL DRIVE OF A MOTOR VEHICLE, INDIVIDUAL WHEEL DRIVE, AND MOTOR VEHICLE

(71) Applicant: AUDI AG, Ingolstadt (DE)

(72) Inventors: Sebastian Albl, Gaimersheim (DE); Josef Rusch, Großmehring (DE); Stefan Hübler, Garching (DE); Benjamin Knöferl, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 383 days.

(21) Appl. No.: 15/541,593

(22) PCT Filed: Dec. 19, 2015

(86) PCT No.: PCT/EP2015/002569
§ 371 (c)(1),
(2) Date: Jul. 5, 2017

(87) PCT Pub. No.: WO2016/102057
PCT Pub. Date: Jun. 30, 2016

(65) Prior Publication Data
US 2017/0346361 A1 Nov. 30, 2017

(30) Foreign Application Priority Data
Dec. 22, 2014 (DE) .......................... 10 2014 019 433

(51) Int. Cl.
*H02K 11/33* (2016.01)
*H02K 5/22* (2006.01)
(Continued)

(52) U.S. Cl.
CPC ........... *H02K 5/225* (2013.01); *B60K 7/0007* (2013.01); *B60L 50/50* (2019.02); *H02K 11/33* (2016.01);
(Continued)

(58) Field of Classification Search
CPC ................................. H02K 5/225; H02K 11/33
See application file for complete search history.

(56) References Cited

U.S. PATENT DOCUMENTS 8,436,500 B2 * 5/2013 Minato ................. H02M 7/003
310/68 C
8,604,655 B1 * 12/2013 Ferran .................... H02K 1/278
310/179
(Continued)

FOREIGN PATENT DOCUMENTS

CN 102255436 A 11/2011
CN 202524224 U 11/2012
(Continued)

OTHER PUBLICATIONS

International Search Report dated Mar. 15, 2016 in corresponding Application No. PCT/EP2015/002569; 12 pgs.
(Continued)

*Primary Examiner* — Robert W Horn
(74) *Attorney, Agent, or Firm* — Maier & Maier, PLLC

(57) ABSTRACT

An electronic component for an electric motor of an individual wheel drive of a motor vehicle, with an electronics housing that can be attached at a motor housing of the electric motor as well as an electrical plug connection device for producing a detachable electrical connection. It is thereby provided that the plug connection device is arranged at a lug projecting from the electronics housing. Exemplary Embodiments invention further relates to an individual wheel drive as well as to a motor vehicle.

9 Claims, 3 Drawing Sheets

(51) Int. Cl.
*H02K 16/00* (2006.01)
*B60K 7/00* (2006.01)
*B60L 50/50* (2019.01)

(52) U.S. Cl.
CPC ...... *H02K 16/00* (2013.01); *B60K 2007/0046* (2013.01); *B60K 2007/0092* (2013.01); *B60L 2220/46* (2013.01); *B60L 2220/50* (2013.01); *B60Y 2400/61* (2013.01); *B60Y 2410/10* (2013.01); *H02K 2213/12* (2013.01); *Y02T 10/641* (2013.01); *Y02T 10/7005* (2013.01)

(56) References Cited

U.S. PATENT DOCUMENTS

| | | | | |
|---|---|---|---|---|
| 9,457,835 | B2* | 10/2016 | Yamasaki | B62D 5/0406 |
| 9,764,734 | B1* | 9/2017 | Brown | B60W 30/04 |
| 9,812,919 | B2* | 11/2017 | Arashi | H02K 5/225 |
| 10,027,203 | B2* | 7/2018 | Schulz | H02K 7/14 |
| 10,177,677 | B2* | 1/2019 | Kim | H02K 11/33 |
| 10,199,902 | B2* | 2/2019 | Naka | H02K 5/22 |
| 10,208,853 | B2* | 2/2019 | Roos | H02K 5/10 |
| 2005/0167183 | A1* | 8/2005 | Tominaga | B62D 5/0406 |
| | | | | 180/444 |
| 2011/0249421 | A1* | 10/2011 | Matsuo | B60K 6/445 |
| | | | | 361/821 |
| 2011/0261600 | A1* | 10/2011 | Tachibana | H02M 7/003 |
| | | | | 363/131 |
| 2012/0286630 | A1* | 11/2012 | Tomizawa | H02K 5/225 |
| | | | | 310/68 D |
| 2015/0002002 | A1* | 1/2015 | Monster | F04D 13/0686 |
| | | | | 310/68 R |
| 2015/0076942 | A1* | 3/2015 | Madsen Obel | H02K 5/18 |
| | | | | 310/59 |
| 2015/0188381 | A1* | 7/2015 | Vohlgemuth | H02K 5/225 |
| | | | | 310/71 |
| 2016/0090053 | A1* | 3/2016 | Kato | H02K 5/225 |
| | | | | 174/520 |
| 2016/0248302 | A1* | 8/2016 | Nagao | H02K 9/19 |
| 2017/0033643 | A1* | 2/2017 | Naka | H02K 5/22 |
| 2017/0203722 | A1* | 7/2017 | Shoda | B60S 1/08 |
| 2017/0264171 | A1* | 9/2017 | Williams | H02K 11/27 |
| 2017/0346361 | A1* | 11/2017 | Albl | H02K 5/225 |
| 2018/0034181 | A1* | 2/2018 | Rathke | H02K 11/33 |
| 2018/0069449 | A1* | 3/2018 | Grasso | H02K 11/33 |
| 2018/0145603 | A1* | 5/2018 | Kim | H02K 11/33 |
| 2018/0152079 | A1* | 5/2018 | Hasegawa | H02K 11/27 |
| 2018/0229763 | A1* | 8/2018 | Kim | B62D 5/0481 |
| 2018/0262089 | A1* | 9/2018 | Hatch | F16H 1/28 |
| 2018/0358860 | A1* | 12/2018 | Major | H02K 5/10 |

FOREIGN PATENT DOCUMENTS

| | | |
|---|---|---|
| CN | 102570700 B | 2/2016 |
| DE | 1129608 B | 5/1962 |
| DE | 29723145 U1 | 4/1998 |
| DE | 19748392 A1 | 5/1999 |
| DE | 19961053 A1 | 7/2001 |
| DE | 102011001483 A1 | 5/2012 |
| DE | 102011009919 A1 | 8/2012 |
| EP | 0951131 A2 | 10/1999 |
| EP | 2323243 A2 | 5/2011 |
| JP | 2011-11597 A | 1/2011 |

OTHER PUBLICATIONS

German Office Action dated Oct. 21, 2015 in corresponding Application No. 10 2014 019 433.7; 6 pgs.

European Examination Report dated Apr. 10, 2018, in connection with corresponding EP Application No. 15 819 790.5 (4 pgs.).

Chinese Office Action dated Sep. 4, 2018, in connection with CN corresponding Application No. 201580070065.6 (18 pgs., including machine-generated English translation).

International Preliminary Report on Patentability dated Jul. 6, 2017, in connection with corresponding international application No. PCT/EP2015/002569 (7 pgs.).

* cited by examiner

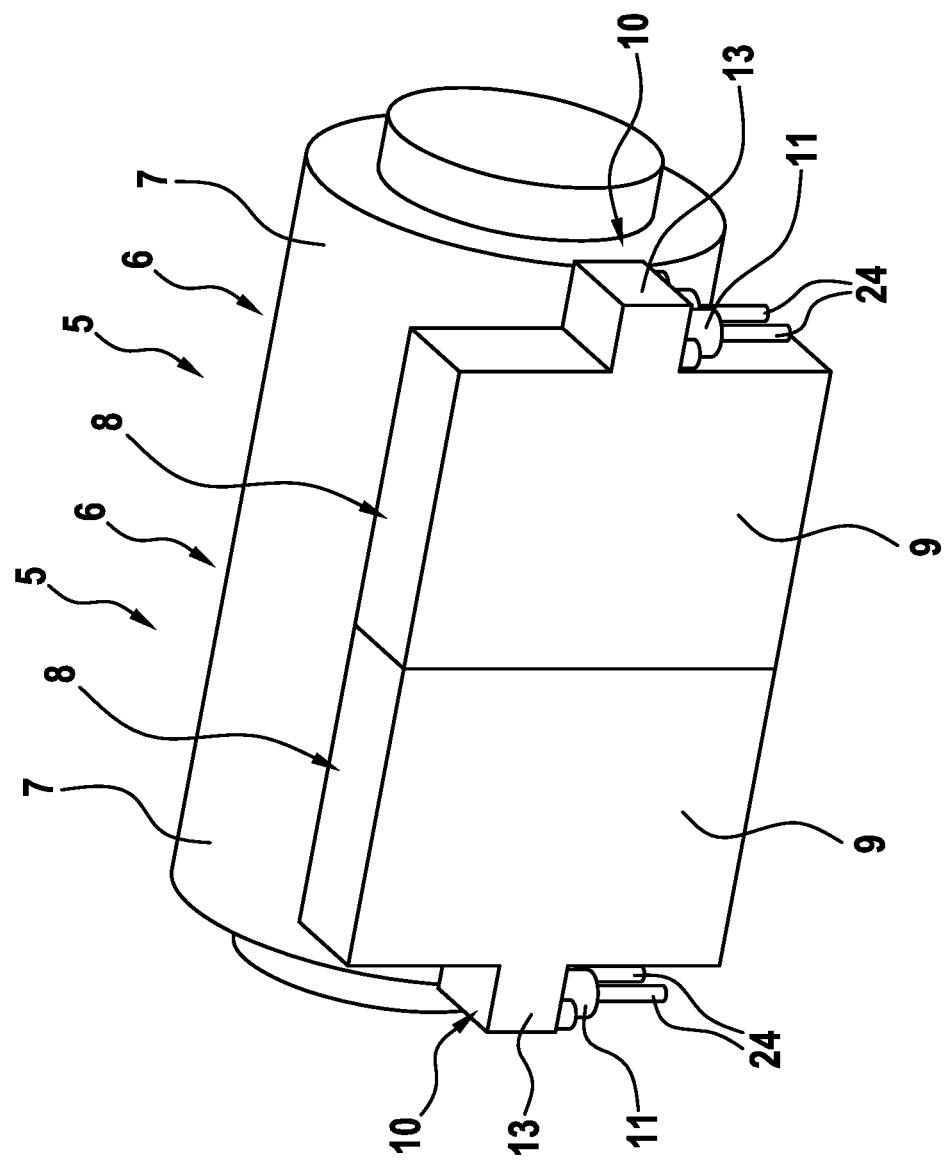

ELECTRONIC COMPONENT FOR AN ELECTRIC MOTOR OF AN INDIVIDUAL WHEEL DRIVE OF A MOTOR VEHICLE, INDIVIDUAL WHEEL DRIVE, AND MOTOR VEHICLE

FIELD

The invention relates to an electronic component for an electric motor of an individual wheel drive of a motor vehicle, with an electronics housing that can be attached at a motor housing of the electric motor as well as an electrical plug connection device for producing a detachable electrical connection. The invention further relates to an individual wheel drive for driving a wheel associated with an axle of a motor vehicle as well as a motor vehicle.

BACKGROUND

The electronic component is preferably associated with the electric motor of the individual wheel drive. The individual wheel drive serves for driving a wheel, in particular a single wheel of the motor vehicle. For example, the motor vehicle has at least one driven axle, which has a plurality, usually two, wheels. An individual wheel drive is then associated with each wheel of the driven axle, so that the wheel can be driven by means of the individual wheel drive. Accordingly, a separate electric motor with a separate electronic component is associated with each wheel of the driven axle.

By use of the individual wheel drive, it is possible to drive the wheel that is associated with the individual wheel drive independently of other wheels of the motor vehicle or of the driven axle. For this purpose, the electric motor is operatively connected to the wheel, in particular rigidly and/or permanently. The electronic component serves for operating the electric motor. In particular, the electronic component comprises a power electronic unit, by means of which electric energy can be supplied to the electric motor.

For example, the power electronics unit is designed as an inverter or at least has such an inverter, with the inverter converting a direct current of an on-board electrical system of the motor vehicle to an alternating current or a three-phase alternating current, which is subsequently supplied to the electric motor. Whereas the vehicle electrical system has only one phase as well as a neutral, the electric motor has a plurality of phases, in particular exactly three phases. In addition, the neutral can be provided. The vehicle electrical system is understood to mean, in particular, a high-voltage electrical system. Said high-voltage electrical system can be present in addition to another on-board electrical system, in particular a low-voltage electrical system. In comparison to the low-voltage electrical system, the high-voltage electrical system is characterized by a higher voltage. Whereas, for example, 12 V is used for the low-voltage electrical system, the high-voltage electrical system preferably has a higher voltage, in particular at least 18 V, at least 24 V, at least 36 V, at least 48 V, or at least 60 V. Higher voltages can also be provided for the high-voltage electrical system, such as, for example, at least 250 V, at least 450 V, or at least 800 V.

SUMMARY OF THE DISCLOSURE

The electronic component has the electronics housing, in which, for example, the power electronics unit is arranged. In addition, the electronic component has the electrical plug connection device, by means of which the detachable electrical connection can be produced. This connection lies preferably between the vehicle electrical system and the electronic component, in particular the power electronics unit. The electronics housing can be attached or is attached at the motor housing of the electric motor. For this purpose, both the electronics housing and the motor housing can have a corresponding connecting flange and the connecting flange of the electronics housing can be attached or is attached at the connecting flange of the motor housing.

In addition, the electronic component is electrically connected directly to the electric motor. In particular, the power electronics unit is electrically connected at phase junctions of the electric motor. This has the advantage that the phase leads, via which this connection exists, are present only between the electronic component and the electric motor and do not pass through other regions of the motor vehicle. For example, the phase leads engage through the connecting flange of the electronics housing and/or the connecting flange of the motor housing. In this way, it is possible to create the shortest possible electrical connection between the electronic component and the electric motor.

The object of the invention is now to propose an electronic component for an electric motor of an individual wheel drive of a motor vehicle, which, in contrast to other electronic components, has advantages, in particular a flexible handling, and/or makes possible a smaller number of parts.

This is accomplished in accordance with the invention by an electronic component with the features of claim 1. It is thereby provided that the plug connection device is arranged at a lug projecting from the electronics housing. In this respect, the plug connection device is not provided directly at the electronics housing, but rather at the lug, which projects from the electronics housing or protrudes above it. In this respect the plug connection device can be designed either as an electrical plug socket or as an electrical plug or can have exactly one plug connector or a plurality of plug connectors, with the plug connector or each of the plug connectors being designed in turn as a plug socket or as a plug. In this case, the plug socket is designed for receiving a plug at least in regions thereof, with the electrical connection being produced once the plug is present in the plug socket at least in regions thereof.

The arrangement of the plug connection device at the lug has the advantage that an extremely flexible arrangement can be realized. In particular, for a corresponding arrangement of the lug at the electronics housing, it is possible to employ the electronic component for a plurality of individual wheel drives, which are preferably associated with the same axle of the motor vehicle, while retaining the configuration of the electrical plug connection device. In doing so, it needs to be ensured above all that it is possible to arrange between boundary surfaces a lead that is electrically connected to the electronic component via the plug connection device, said boundary surfaces being defined, on the one hand, by a vehicle body panel—for example, a body panel of the underbody of the motor vehicle—and, on the other hand, by a ground or subsurface on which the motor vehicle moves.

Additional boundary surfaces are defined by the electric motor itself or the motor housing and/or the wheel driven by means of the electric motor. In particular, for an appropriate arrangement of the lug at the electronics housing, it is possible, in spite of the construction of a plurality of electronic components associated as identical parts with the same axle of the motor vehicle, to connect the lead, which is attached at the respective electronic component, always from the same direction, preferably from the direction of the subsurface of the motor vehicle, to the plug connection device. For this purpose, the plug connection device is designed, for example, bidirectionally, so that it is possible to attach the lead at the lug both from one side and from another side lying opposite to said side. However, it can also be provided that exactly one plug connector of the plug connection device is present at the lug and is arranged at the lug in such a way that the lead can be brought to the lug from the desired side and connected to the plug connector.

Another embodiment the invention provides that the lug is designed in such a way that it protrudes over the plug connection element when the plug connection element is electrically connected to the plug connection device. It was stated above that the plug connection device is designed as a plug socket or as a plug or at least has a correspondingly designed plug connector. If the plug connection device or the plug connector is present as a plug socket, then the plug connection element is designed as a plug. Conversely, it holds that, for an embodiment of the plug connection device or of the plug connector as a plug, the plug connection element is designed as a plug socket.

The lug then has dimensions that are chosen in such a way that that the lug engages completely over the plug connection element, in particular in a plane that is perpendicular to a plugging direction of the plug connection element and in which the plug connection element is connected to the plug connection device. Preferably, the plane is arranged parallel to the axis of rotation of the electric motor or incorporates said axis of rotation. Therefore, the lug projects over the electronics housing in the axial direction, for example, with respect to an axis of rotation of the electric motor. Preferably, the lug, viewed geodetically, is arranged over the plug connection element and accordingly engages over said plug connection.

The plug connection element can be connected fundamentally in any way to the plug connection device and/or to the electronics housing, in particular to the lug. For example, the plug connection element is connected to the plug connection device or to the electronics housing or to the lug in a force-fitting manner and/or in a form-fitting manner. In particular, to this end, a screw connection is provided, so that the plug connection element is connected first of all by plugging it into the plug connection device and subsequently is attached to the plug connection device by producing the screw connection. This attachment can be permanent or detachable.

A preferred further embodiment of the invention provides that the lug has two opposite-lying connection surfaces, wherein a first plug connector of the plug connection device lies at a first of the connection surfaces and/or a second plug connector of the plug connection device lies at a second of the connection surfaces. In this respect, the plug connection device has one plug connector or a plurality of plug connectors, namely, the first plug connector or the second plug connector or, alternatively, the first plug connector and the second plug connector. What was stated above in regard to the plug connection device applies to this situation. Thus, if the plug connection element is present as a plug, then the plug connector is designed as a plug socket. In an embodiment of the plug connection element as a plug socket, the plug connector is present as a plug.

In order to achieve the above-mentioned bidirectional embodiment of the plug connection device, the two plug connectors are arranged at opposite-lying connection surfaces of the lug. In this case, the two plug connectors are preferably electrically connected to each other, so that it is irrelevant whether the plug connection element is brought into electrical connection with the first plug connector or with the second plug connector. Both during production of the electrical connection between the plug connection element and the first plug connector and during production of the electrical connection between the plug connection element and the second plug connector, there is thus always the same, in particular identically poled, electrical connection between the plug connection element and the plug connection device or the electronic component.

Because preferably always only one of the plug connectors is connected to the plug connection element, the plug connector that is not needed can be designed as a dummy plug connector, that is, for example, as a dummy plug or dummy plug socket. To this end, said plug connector is preferably closed with a cap, with it being possible to associate a seal with the cap. Obviously, it can also be provided that, in each instance, one plug connection element is electrically connected to the two plug connectors and hence an electrical connection is produced with the electronic component, in particular between the vehicle electrical system and the electronic component, both via the first plug connector and via the second plug connector. To this end, the two plug connectors are connected in parallel electrically. With such an embodiment, the electric power supplied to the electronic component, in particular the amperage occurring during operation, can be markedly increased.

For example, the first plug connector or the connection surface at which it is present faces the body of the motor vehicle or the body panel, whereas the second plug connector or the connection surface at which the second plug connector is present faces away from the vehicle body or the body panel. However, the reference to a first plug connector or first connection surface can also depend on the orientation of the electronic component, so that the plug connector facing the vehicle body is referred to, in a first orientation as a first plug connector and, in an second orientation that is different from the first orientation, as a second plug connector. For example, the two orientations differ by an angle of rotation of 180°.

Obviously, however, it is alternatively possible for only a single one of the plug connectors to be present, namely, either the first plug connector or the second plug connector. In this case, it can be provided, for example, that the plug connector arranged at the lug is the plug connector having the desired alignment. Preferably, in accordance with a kind of modular system, it is possible to provide for at least two electronic components, which differ from each other only with respect to the configuration of the plug connection device, that is, in terms of the presence either of the first plug connector or of the second plug connector. Then, if differently oriented individual wheel drives are created, the electronic components that are chosen and associated with the individual wheel drives are those electronic components that have the same alignment of the plug connector for the individual wheel drives. At a first of the individual wheel drives, for example, in this regard, an electronic component with the first plug connector and, at a second of the individual wheel drives, an electronic component with the second plug connector are built in.

For provision of the electronic components, they are preferably initially designed identically and, in particular, identical electronics housings are provided, each of which already has the lug. For this reason, it is possible to use the same manufacturing tool for the two electronic components.

Preferably, the lug is designed in one piece and/or in a material in common with the remainder of the electronics housing.

Subsequently, for each of the electronic components, a socket opening for the respective plug connector is formed in the lug. This can be done, for example, by drilling, cutting, or stamping. In the process, the socket opening is introduced into the first of the connection surfaces for a first of the electronic components and into the second of the connection surfaces for a second of the electronic components. The other respective connection surface remains unprocessed. Subsequently, the respective plug connector is introduced into the socket opening of the first electronic component and into the socket opening of the second electronic component and attached there.

It is especially advantageous when, for the electronic components, apart from the plug connectors, the same construction exists, in particular in terms of electronic components. Accordingly, the finished electronic components differ exclusively in terms of the arrangement of the plug connector at the lug.

In summary, at least three configurations ensue, which are once again summarized by way of example: On the one hand, a plurality of plug connectors can be present at the lug, with a plurality of these plug connectors each being electrically connected to a plug connection element. Alternatively, a plurality of plug connectors can be provided, but at least one of these is designed as a dummy plug connector. It is also possible to arrange a plug connector not at all of the connection surfaces, but rather only at at least one of the connection surfaces, preferably only at one of connection surfaces. In the latter of the two cases, preferably only one plug connection element is used for producing the electrical connection to the electronic component, in particular between the vehicle electrical system and the electronic component.

A preferred embodiment of the invention provides that the connection surfaces are aligned parallel to each other. Preferably, the opposite-lying connection surfaces are each defined by a plane or lie in this plane. The connection surfaces or these planes then lie parallel to each other, but spaced apart from each other. For example, the two planes and, in this regard, the two connection surfaces have the same distance from the axis of rotation of the electric motor after the individual wheel drive has been mounted.

An enhancement of the invention provides that the distance between the connection surfaces in the direction of the normal line to the connection surfaces, in relation to the dimensions of the electronics housing in the direction of the normal line, is at most 90%, at most 80%, at most 75%, at most 70%, at most 60%, at most 50%, at most 40%, at most 30%, at most 25%, at most 20%, or at most 10%. As already stated, the connection surfaces are each defined by a plane. The direction of the normal line is perpendicular to at least one of these planes, preferably to both planes. In this direction, the connection surfaces have a distance from each other that, in relation to the dimensions, in particular the maximum dimensions, of the electronics housing, has one of the mentioned values in this direction. This means that, in this direction, the lug is preferably smaller than the electronics housing, in particular markedly smaller.

A preferred enhancement of the invention provides that the lug is arranged at a distance from opposite-lying lateral surfaces of the electronics housing. The lateral surfaces delimit the electronics housing in the direction of the normal line already mentioned above, preferably in the geodetically vertical direction. For example, the lateral surfaces are the points of the electronics housing that are formed in the direction of the normal line at the points of the electronics housing that are most distant from the lug. The lug is then intended to be distanced from the two lateral surfaces.

This has the advantage that, when the electrical connection is produced between the plug connection element and the plug connection device, regardless of which plug connector interacts with the plug connection element, the plug connection element and/or the leads joined to the plug connection element run parallel to a wall of the electronics housing at least in sections thereof, over which the lug preferably protrudes. Consequently, a protected arrangement of the plug connection element and/or of the lead is realized.

Especially preferred, it can be provided in this case that the lug is centered between the lateral surfaces. Overall, therefore, the lug is provided at the electronics housing in the middle in at least one direction, namely, in the direction of the normal line. This means that it has the same distance from the lateral surfaces mentioned above. In this way, it is possible, in particular together with the bidirectional plug connection device, to create an embodiment of a plurality of electronic components as identical parts. Said electronic components can be rotated, for example, by an angle of rotation of 180° with respect to each other and nonetheless enable a mounting of the plug connection element at the plug connection device or at the plug connectors from the same direction in each case, for example from below.

The invention further relates to an individual wheel drive for driving a wheel associated with an axle of a motor vehicle, with an electric motor and an electronic component, in particular in accordance with the above designs, wherein the electronic component has an electronics housing attached at a motor housing of the electric motor as well as an electrical plug connection device for producing a detachable electrical connection. It is thereby provided that the plug connection device is arranged at a lug projecting from the electronics housing.

The advantages of such an embodiment of the individual wheel drive and of the electronic component have already been indicated. Both the individual wheel drive and the electronic component can be further developed in accordance with the above designs, so that reference to said designs is made in this regard.

An advantageous enhancement of the invention provides that the lug, viewed in cross section, is arranged at the level of an axis of rotation of the electric motor. This can be understood to mean, on the one hand, that, in the geodetically vertical direction, the lug is present at the electronics housing in such a way that, in this direction, it overlaps with the axis of rotation of the electric motor. Especially preferred, however, it is provided that the lug is centered in the geodetically vertical direction in relation to the axis of rotation of the electric motor. The consequence of this is that, for example, a plurality of plug connectors of the plug connection device or different plug connectors of the plug connection devices of a plurality of individual wheel drives have an identical distance to the axis of rotation.

If, for example, a plurality of individual wheel drives, which are associated with the same axle, but different wheels of the axle, are then present, the axes of rotation of the electric motors of the individual wheel drives preferably coincide. The electronic components of the individual wheel drives have the lug on opposite-lying sides in the axial direction in relation to the axes of rotation and hence are rotated with respect to one another by 180°, for example in the case of adjacently arranged electronic components, for example, one of the lugs projects from the respective electronics housing to the left, the other to the right. The electronic component of one of the individual wheel drives then has the first plug connector, but not the second plug connector, whereas the electronic component of another of the individual wheel drives has the second plug connector, but not the first plug connector. The consequence of this is that the plug connectors of the electronic components have the same orientation, for example downward in the geodetical direction, so that the plug connection element at both individual wheel drives is thus brought to the respective electronic component from the same direction and can be connected to it.

The invention further relates to a motor vehicle with an axle, which is associated with a plurality of individual wheel drives for driving wheels of the axle, wherein each individual wheel drive has an electric motor and an electronic component, in particular in accordance with the above designs, wherein the electronic component has an electronics housing attached at a motor housing of the electric motor as well as an electrical plug connection device for producing a detachable electrical connection. It is thereby provided that the plug connection device is arranged at a lug projecting from the electronics housing.

Here, too, reference is made once again to the already discussed advantages of such an embodiment of the motor vehicle, of the individual wheel drive, or of the electronic component. Obviously, the motor vehicle, the individual wheel drive, and the electronic component in accordance with the above designs can be further developed or enhanced, so that reference is made once again to said designs.

Especially preferred, in another embodiment of the invention, it is provided that the electronic components of the individual wheel drives are designed as identical parts. This means that the electronic components are designed identically and only arranged or can be arranged in different orientation. For example, the electronic components of the plurality of individual wheel drives are aligned in such a way that the lugs point in opposite directions, that is, for example, outward in the lateral direction. The lateral direction is understood here to mean a direction that is parallel to a subsurface of the motor vehicle and perpendicular to a longitudinal axis of the motor vehicle or is in the forward direction of travel of the motor vehicle.

In other words, the lugs are arranged in the axial direction in relation to the axes of rotation of the electric motors on opposite-lying sides of the electronics housing that face away from each other. In this case, preferably, at least the electronics housing is produced with the lugs initially as identical parts. Subsequently, the first plug connector, the second plug connector, or both plug connectors can be mounted at the lug, in particular in the respective, correspondingly created socket opening.

In the already above-discussed bidirectional embodiment of the plug connection device, it is then possible to bring the plug connection element to the plug connection device always—viewed geodetically—from below. This is also possible when, at one of the lugs, the first plug connector is present and, at another of the lugs, the second plug connector is present. This has the advantage that, at any time, in a straightforward manner, it is possible to access the plug connection device, the plug connection element, and the lead associated with it. In order to detach the electrical connection, it is therefore not necessary, first of all, to remove the electronic component from the motor housing or to disassemble the individual wheel drive.

The invention will be explained in detail below on the basis of the exemplary embodiments illustrated in the drawing, without resulting in any limitation of the invention. Shown are:

BRIEF DESCRIPTION OF THE DRAWING

FIG. 3 a detailed view of a plurality of individual wheel drives.

DETAILED DESCRIPTION OF THE DRAWING

Figure 1:
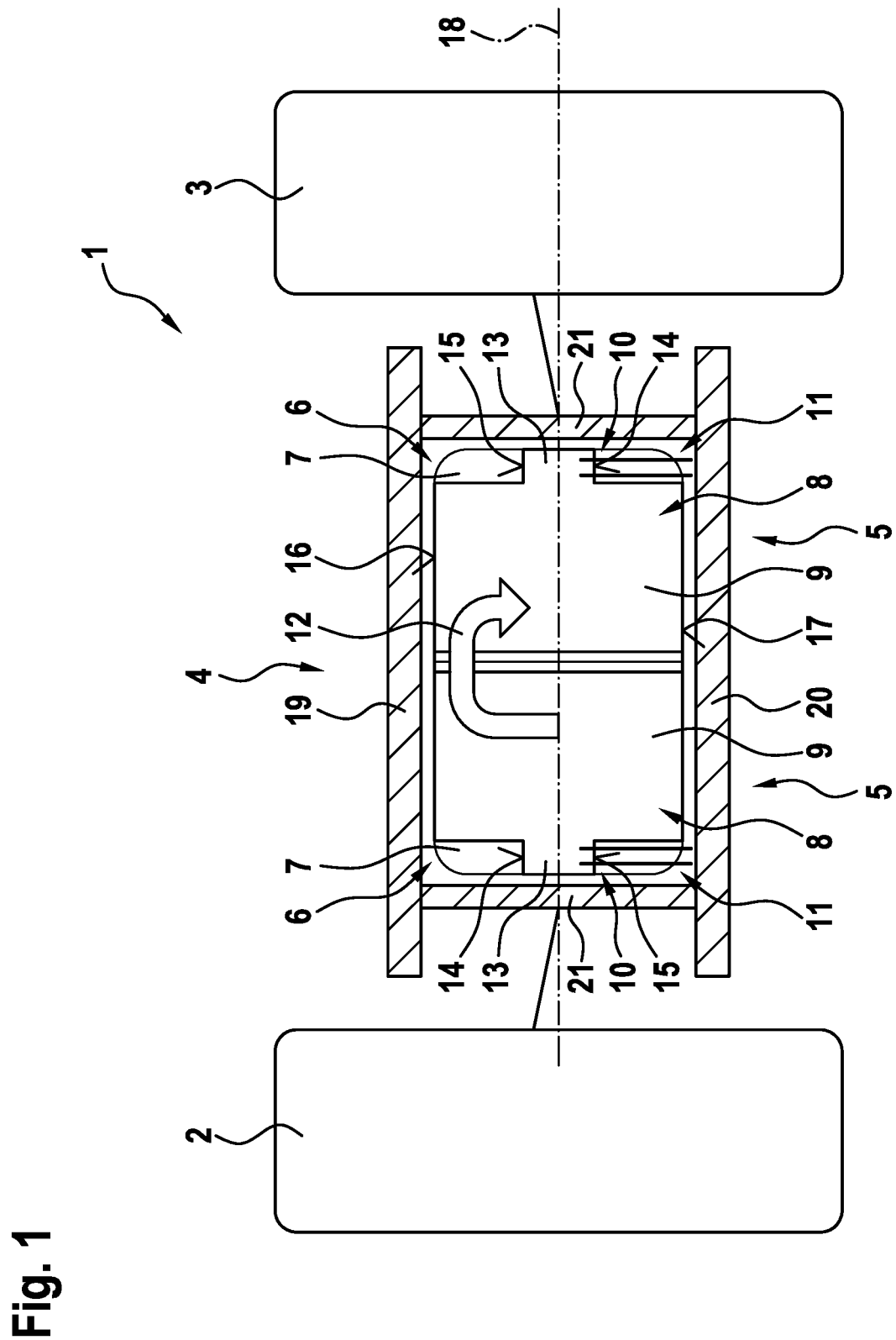
FIG. 1 a schematic cross-sectional illustration through a region of a motor vehicle.

FIG. 1 shows a cross-sectional illustration through a region of a motor vehicle 1. Illustrated are wheels 2 and 3 of an electrically driven axle 4. Associated with each wheel 2 and 3 is an individual wheel drive 5. Each individual wheel drive 5 has an electric motor 6 with a motor housing 7. Attached at the motor housing 7 is an electronic component 8, in particular an electronics housing 9 of the electronic component 8. Each electronic component 8 has an electrical plug connection device 10, which serves for producing a detachable electrical connection to a plug connection element 11.

At least the electronic components 8, but preferably the individual wheel drives 5, are designed as identical parts. This means that identical electronic components 8 or individual wheel drives 5 can be associated with the wheels 2 and 3. This is indicated by the arrow 12. The individual wheel drive 5, associated with the wheel 2, in this regard, can be converted by a simple rotation by 180° to the individual wheel drive 5, associated with the wheel 3.

This is achieved, in particular, in that the plug connection device 10 is arranged at a lug 13 projecting from the electronics housing 9. Preferably, in this case, the plug connection devices 10 are designed bidirectionally, so that the plug connection elements 11 can always be brought to the plug connection device 10—viewed geodetically—from below. This is achieved, for example, in that the lug 13 has two opposite-lying connection surfaces 14 and 15. Provided at the connection surface 14 is then a first plug connector, whereas, at the connection surface 15, a second plug connector is present. These are electrically wired identically, so that the same electrical connection can be produced between the plug connection element 11 and the electronic component 8 both by mounting the plug connection element 11 at the first plug connector and by mounting at the second plug connector.

However, it can also be provided that the respective plug connector is always arranged only at the connection surface 14 or 15 of the lugs 13 that has a corresponding orientation, for example geodetically below the other connection surface 15 or 14 in each instance.

Preferably, it is provided that the connection surfaces 14 and 15 are parallel to each other. In the exemplary embodiment illustrated here, the lug 13 has, in the direction of the normal line of the connection surfaces 14 and 15, dimensions that are at most 25% of the dimensions of the electronics housing 9 in the same direction. At the same time, the lug is centered between two lateral surfaces 16 and 17 of the electronics housing 9, which delimit the electronics housing 9 in the direction of the normal line mentioned above.

Especially preferred, the lug 13, viewed in cross section, lies at the level of an axis of rotation 18 of the electric motor 6; for example, the lug 13 is centered in relation to the axis of rotation 18—viewed in cross section. The axis of rotation 18 therefore passes through the lug 13 or intersects it at the center. In such an embodiment, the plug connection element 11 can always be mounted in a straightforward manner from the same direction, regardless of the orientation in which the electronic component 8 is mounted at the motor housing 7. In addition, the plug connection element 11 and/or a lead extending from it is always arranged, at least in regions, next to the electronics housing 9 and/or next to the motor housing 7, so that a certain protection against detrimental mechanical effects is afforded.

It is clear that the individual wheel drives 5 can be arranged in a straightforward manner between installation space boundaries 19, 20, and 21. The installation space boundary 19 is defined by a body of the motor vehicle 1, in particular by a body panel. The installation space boundary 20, in contrast, is defined by a subsurface or ground on which the motor vehicle 1 moves. The installation space boundaries 21 are predetermined by the wheels 2 and 3.

Figure 2:
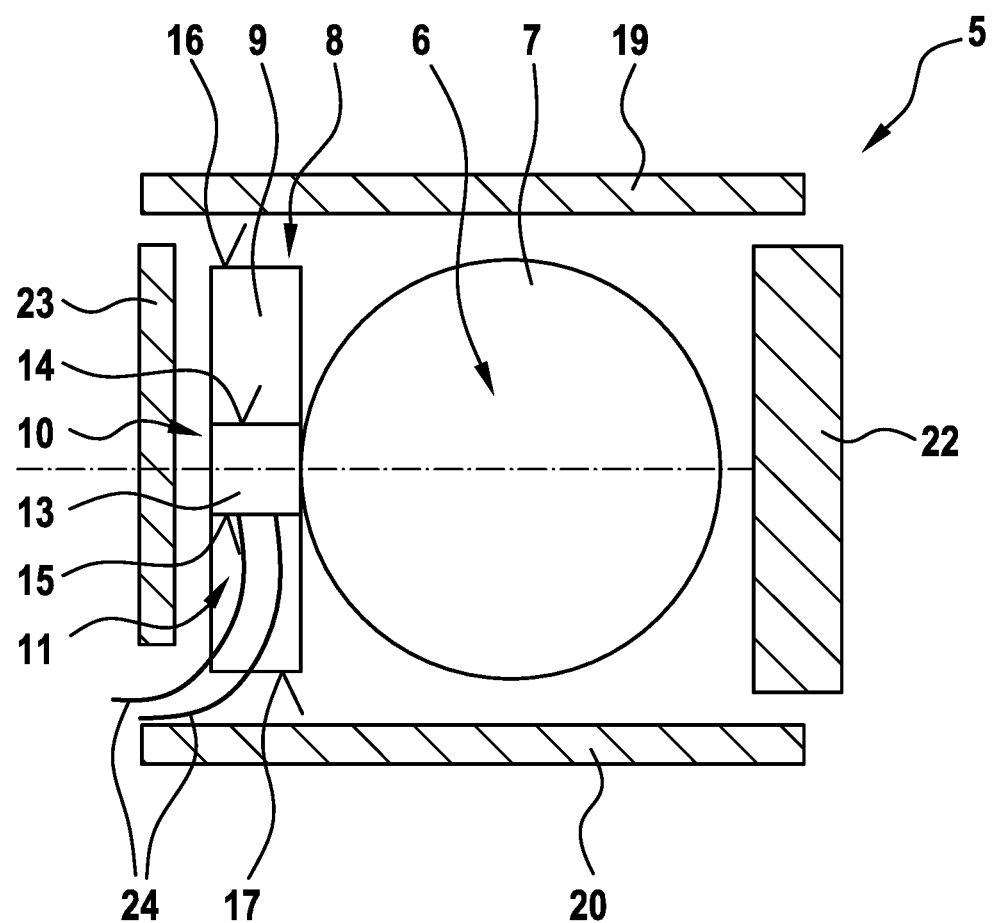
FIG. 2 a side view of the region of the motor vehicle.

FIG. 2 shows a side view of the individual wheel drive 5. Illustrated in addition to the installation space boundaries 19 and 20 are now installation space boundaries 22 and 23, which, for example, are determined depending on the axle 4. For example, the installation space boundaries 22 and 23 are likewise defined by the body of the motor vehicle 1. Even though the leads 24 extending from the plug connection element 11 have to be designed with a minimum radius of curvature, the arrangement of the leads 24, governed by the special arrangement of the lug 13 at the electronics housing 9, is possible in a straightforward manner.

FIG. 3 shows another illustration of two individual wheel drives 5, which, in accordance with the above designs, each have the electric motor 6 and the electronic component 8. Clearly seen here once again is the centered arrangement of the lug 13 and the mounting situation of the plug connection elements 11 resulting from it.

The invention claimed is:

1. An electronic component comprising:
an electric motor of an individual wheel drive of a motor vehicle, with an electronics housing that can be attached at a motor housing of the electric motor as well as an electrical plug connection device for producing a detachable electrical connection, wherein the plug connection device is arranged at a lug projecting from the electronics housing, wherein the lug, viewed in cross section, is arranged at the level of an axis of rotation of the electric motor.

2. The electronic component according to claim 1, wherein the lug is designed in such a way in that, for a plug connection element that is electrically connected to the plug connection device, said lug protrudes above the plug connection element.

3. The electronic component according to claim 1, wherein the lug has two opposite-lying connection surfaces, with a first plug connector of the plug connection device being present at a first of the connection surfaces and a second plug connector of the plug connection device being present at a second of the connection surfaces.

4. The electronic component according to claim 1, wherein the connection surfaces are aligned parallel to each other.

5. The electronic component according to claim 1, wherein the distance between the connection surfaces in the direction of the normal line to the connection surfaces, in relation to the dimensions of the electronics housing in the direction of the normal line, is at most 90%, at most 80%, at most 75%, at most 70%, at most 60%, at most 50%, at most 40%, at most 30%, at most 25%, at most 20%, or at most 10%.

6. The electronic component according to claim 1, wherein the lug is arranged at a distance from opposite-lying lateral surfaces of the electronics housing.

7. An individual wheel drive for driving a wheel comprising:
an axle of a motor vehicle, with an electric motor and an electronic component, wherein the electronic component has an electronics housing attached at a motor housing of the electric motor as well as an electrical plug connection device for producing a detachable electrical connection, hereby characterized in that the plug connection device is arranged at a lug projecting from the electronics housing, wherein the lug, viewed in cross section, is arranged at the level of an axis of rotation of the electric motor.

8. A motor vehicle with an axle, which is associated with a plurality of individual wheel drives for driving wheels of the axle, wherein each individual wheel drive has an electric motor and an electronic component, wherein the electronic component has an electronics housing attached at a motor housing of the electric motor as well as an electrical plug connection device for producing a detachable electrical connection, hereby characterized in that the plug connection device is arranged at a lug projecting from the electronics housing, wherein the lug, viewed in cross section, is arranged at the level of an axis of rotation of the electric motor.

9. The motor vehicle according to claim 8, wherein the electronic components of the individual wheel drives are designed as identical parts.

* * * * *